March 5, 1957  A. J. HUCK  2,784,289
TEMPERATURE CONTROL
Filed Sept. 13, 1952  2 Sheets-Sheet 1
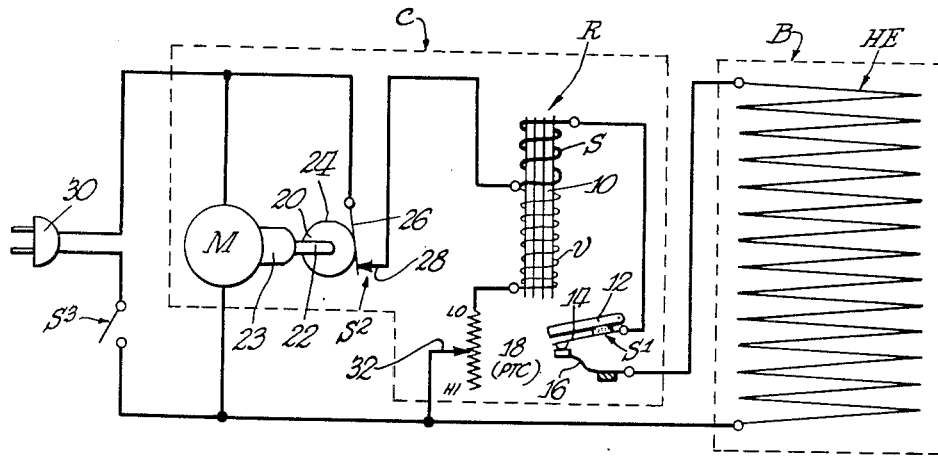
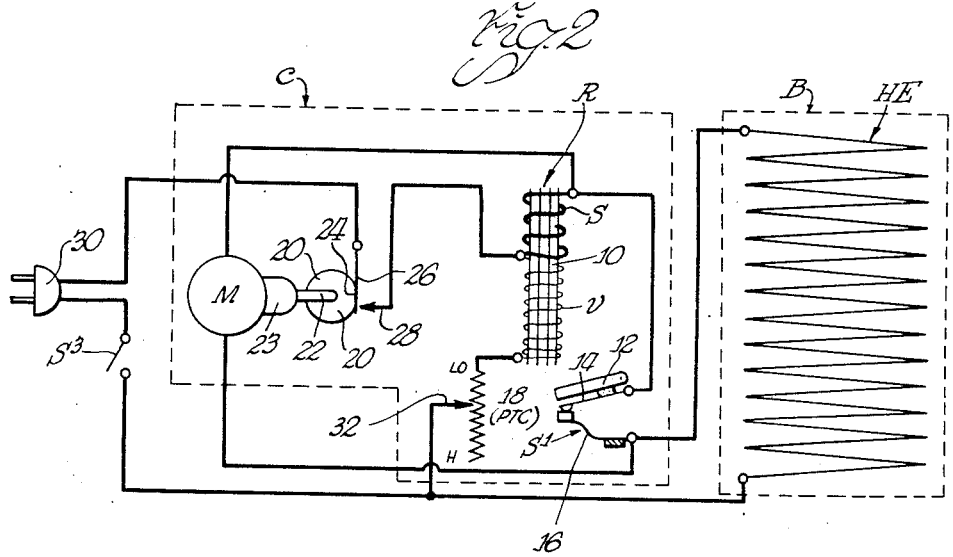

March 5, 1957  A. J. HUCK  2,784,289
TEMPERATURE CONTROL
Filed Sept. 13, 1952  2 Sheets-Sheet 2
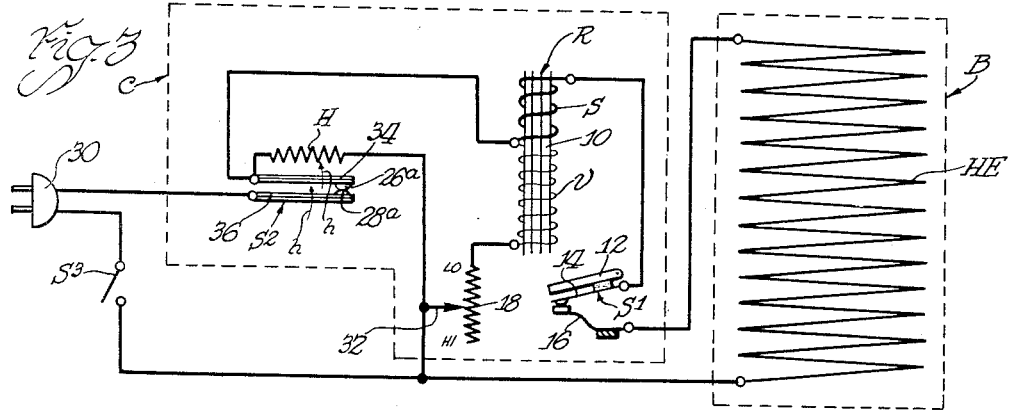
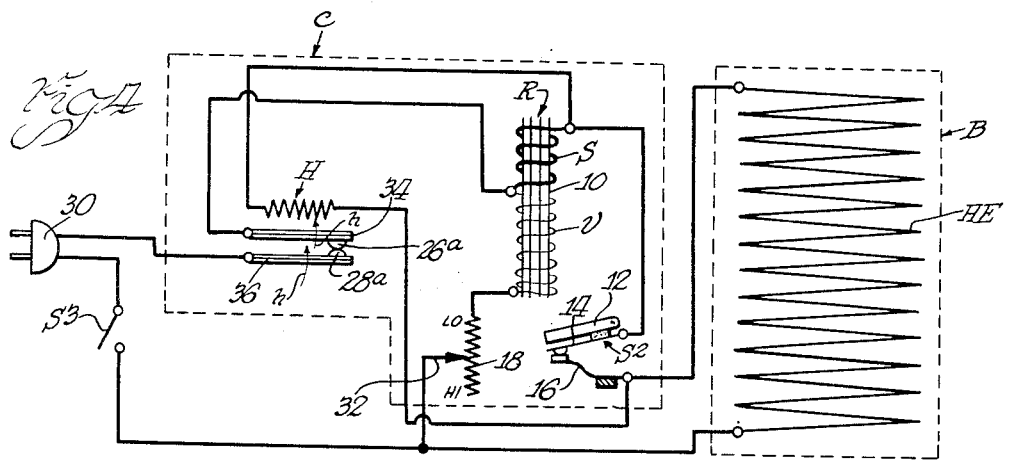
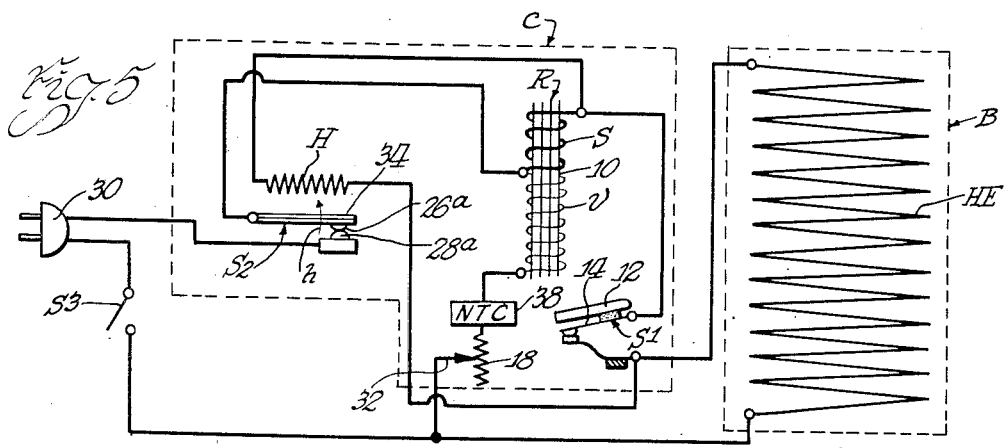
Inventor
Alfred J. Huck
by Bair, Freeman & Molinare
Attys.

United States Patent Office 2,784,289
Patented Mar. 5, 1957

2,784,289

TEMPERATURE CONTROL

Alfred J. Huck, St. Louis, Mo., assignor to Knapp-Monarch Company, St. Louis, Mo., a corporation of Delaware Application September 13, 1952, Serial No. 309,479

4 Claims. (Cl. 219—20)

This invention relates to a temperature control and particularly to one designed for both primary and secondary control of electric warming blankets and the like wherein it is desirable to maintain the blanket at a substantially constant temperature, wherein it is further desirable to provide a control which automatically compensates for changes in room temperature so that the blanket remains at a substantially comfortable temperature regardless of such room temperature changes and wherein it is desirable to provide a control that also functions as a secondary control.

One object of the invention is to provide a primary control device which utilizes a differential relay having oppositely wound coils to control the switch of the relay, which switch is in circuit with the heating element of the blanket for de-energizing it when the desired temperature is reached and energizing it again when the temperature drops slightly below that desired.

A further object is to provide a primary temperature control which includes a differential relay that normally locks out when it breaks the circuit and a monitoring switch in conjunction therewith to reset the relay periodically in order to permit it to continue to function properly for automatic temperature control of the blanket after it has once broken the circuit to the blanket.

Another object is to provide a differential relay type of control for a blanket or the like which, in addition to performing its temperature regulating function, also serves as a secondary or safety cut-out switch in the event of damage or other malfunctioning of any of the parts of the circuit or of the blanket itself, whereupon it operates to de-energize the blanket and maintain it in the de-energized condition until the blanket is disconnected from the current supply. The conventional method of obtaining such secondary or safety control is to provide a number of small thermostats or fuses in the blanket proper which serve to limit the temperature of the blanket if the primary control fails to operate. However, such arrangements have several obvious disadvantages. They require spliced connections to the blanket heating element and such connections are vulnerable spots in the assembly. Thermostats and fuses are somewhat bulky and may be damaged when the blanket is flexed or otherwise handled in bed and they detract from the ease of washing the blanket. In the case of temperature limiting thermostats, there is no permanent de-energization of the blanket in the event of trouble in the primary control or the control which is usually provided to function as a means to keep the blanket at a substantially constant temperature.

It is therefore another object of my present invention to provide a control which is not mounted in the blanket itself but is part of a separate control device which functions both as a primary and as a secondary control.

A further object is to provide a combination control of the character disclosed which, although not mounted in the blanket, responds to the temperature thereof because of the heating element in the blanket changing resistance as a result of increased temperature of the blanket itself and thereby affecting a series coil of the differential relay.

Still a further object is to provide a temperature control utilizing a differential relay or one that has differential windings that oppose each other so that the magnetic effect is substantially equal in the core of the relay until such time as one of the coils sufficiently overbalances the other as the blanket warms up beyond the desired temperature and thereby causes less current to flow through one of the coils which is in series with the heating element of the blanket, and the disturbed balance of magnetic forces results in opening of the temperature control switch for de-energizing the blanket, the arrangement being such that once the contacts of the switch are separated, the effect of the other coil alone quickly snaps the switch to the wide-open position and retains it there until a resetting operation occurs.

An additional object is to provide an electric or thermal motor or the like for the resetting operation which motor operates a monitoring switch for the differential relay to periodically open the circuit thereto so that the relay switch will return to the closed position and remain there when the monitoring switch again closes the circuit providing the temperature of the blanket has dropped sufficiently to again balance the current in the two coils of the differential relay.

Another additional object is to provide a control for a blanket which, when it functions as a safety control, does not permit the blanket to attain any higher than its normal high temperature so that when a portion of the blanket is abnormally folded and thereby attains a temperature higher than the average blanket temperature, the change in resistance of the heating element of the blanket will trip the differential relay to the open circuit position, to which position it will return if upon breaking and remaking the circuit at the monitoring switch the high temperature condition in the blanket still exists.

With these and other objects in view, my invention consists in the construction, arrangement and combination of the various parts of my temperature control, whereby the objects contemplated are attained, as hereinafter more fully set forth, pointed out in my claims and illustrated in the accompanying drawings, wherein:

Figure 1 is an electro-diagrammatic view showing one form of my invention wherein an electric motor is used to operate the monitoring switch.

Figure 2 is a slightly modified form wherein the current supply for the electric motor is controlled somewhat differently than in Figure 1.

Figure 3 is a view similar to Figure 1 showing a thermal motor used as a monitoring switch.

Figure 4 is a similar view wherein the current for the monitoring switch is modified in somewhat the manner of Figure 2; and Figure 5 is a view similar to Figure 4 showing the use of a negative temperature coefficient resistor in the circuit used as a compensator for room temperature in place of a bimetallic type of compensator shown in Figures 3 and 4.

On the accompanying drawings I have used the reference characters B and C to indicate in general a warming blanket and a control therefor. These are merely outlined with dash lines to show the elements of the blanket and the control contained therein respectively. The blanket has a heating element HE of the usual type which may be designed for energization at a maximum of approximately 85° F. The control C includes a main or primary control switch $S^1$, a monitoring switch $S^2$ and a manual switch $S^3$. The switch $S^3$ is the usual "on-off" switch and may be part of the control C if desired.

Within the control C I provide a differential relay indicated generally at R and shown as comprising a core 10, series and voltage coils S and V respectively, an armature 12 and the switch S¹ comprising a contact blade 14 on the armature 12 and a stationary contact blade 16. The position of the contact on the blade 16 may be adjusted by bending the blade. The opening and closing of the switch S¹ is under the control of the armature 12, the contacts being normally closed due to the armature 12 being biased downwardly by gravity as shown or by a suitable spring. The voltage coil V may also be considered a parallel coil with respect to the heating element HE. An adjustable calibrating resistor or rheostat 18 is also provided.

The control C further includes means for operating the monitoring switch S² and as shown in Figures 1 and 2 this comprises an electric motor M and a cam 20 driven by a slow speed shaft 22 thereof. The shaft 22 may be driven from the motor shaft in the usual manner through step-down gearing contained in a housing 23. The cam 20 has a flat spot 24 to engage a switch blade 26 of the switch S² as in Figure 2 to open the circuit between it and a stationary contact 28. In other positions of the cam as shown in Figure 1, the blade 26 normally closes against the contact 28 and the closed portion of the monitoring or timing cycle is preferably much longer than the open circuit portion thereof, the ratio being, for instance, nine-to-one or the open circuit position being one-tenth of the total time.

With respect to the relay R, the voltage coil V consists of many turns of fine wire and is responsive to input voltage from a plug 30 usually provided for plugging the blanket into a service outlet. The magnetomotive force of the coil V is calibrated by the rheostat 18. The series coil S consists of a few turns of heavy wire and, being in series with the heating element HE as shown, it is responsive to the current drawn by the blanket B. The rheostat 18 may be adjusted to balance the magnetomotive force of the two coils V and S in the low blanket temperature range so that when the blanket attains the desired temperature the heating element HE rises in temperature which results in its resistance increasing. This in turn results in a current drop in the coil S such that the magnetomotive force produced thereby reduces and when the reduction reaches a certain point with respect to that of the voltage coil V, V overpowers S sufficiently to attract the armature 12 and thereby open the switch S¹ to de-energize the blanket. Just as soon as the contacts separate, the full magnetomotive force of the coil V is effective to snap the armature to the wide-open position and hold the contact 14 separated from the contact 16.

Since the heating element of the blanket is now de-energized, the blanket will cool down. The rheostat 18 is made adjustable so as to vary the cut-out point of the blanket B. This point may be lowered by reducing the effective resistance of the rheostat or raised by increasing it as indicated by "LO" and "HI" adjacent the ends of the coil 18, the slider 32 of the rheostat being movable between these limits. Preferably the rheostat is wound with wire having a positive temperature coefficient in order to provide some compensation for changes in room temperature and thus the blanket remains at a substantially comfortable temperature even though the room temperature may raise or lower.

As shown in Figure 1, the motor M, which may be a small synchronous clock type motor, is used to open and close the contacts 26—28 which control the relay R and the heating element HE. This motor operates strictly on a time basis, having its cam 20 so designed as to maintain some desirable "on" period such as 90% of the time. It will operate whenever the manual switch S³ is closed in order to place the blanket into operation. In this manner, the blanket B is only 90% effective, but that is sufficient to meet the maximum demand on a blanket of this type if HE is designed for 200 watts as 180 watts is usually sufficient if the blanket operates 100% of the time.

The intermittent breaking of the circuit or monitoring by the motor M is necessary to permit the relay R to be de-energized and thus reset in a simple manner at spaced intervals. Otherwise it would lock out once the desired blanket temperature had been attained. With the monitoring system, the relay is energized along with the heating element HE and breaking the circuit at intervals permits the armature 12 to fall back to close the contact 14 on the contact 16 so that if the blanket has cooled sufficiently that it needs more heating, the relay relaxes its attraction for the armature by reason of the coils V and S balancing and permits the contacts of the switch S¹ to remain closed until such time as the temperature of the blanket again becomes high enough to require the circuit to be interrupted.

With the circuit arrangement shown in Figure 1, the motor M, together with the switch S², will act as a reset timer only when the switch S¹ of the relay R is open. As long as this switch remains closed, the switch S² acts as a circuit interrupter as it de-energizes the blanket unnecessarily when the relay is in the normally closed position of Figure 1. In this case, the blanket has not attained the proper temperature even though it is de-energized.

To overcome this difficulty, the circuit for the motor M may be arranged as in Figure 2—across the switch S¹ instead of across the line wires. This arrangement eliminates the fault just referred to. The motor M is not energized until after the switch S¹ opens and once it is open, then when the flat 24 of the cam 20 engages the switch blade 26 as in Figure 2, it causes the relay R to be reset. The circuit of the blanket is therefore not periodically interrupted as in Figure 1 and relay reset occurs only after the desired maximum temperature has been attained and the relay dropped out.

The monitoring switch S² of Figure 3 is operated by a thermal motor consisting of a bimetal blade 34 and a heater H therefor. A contact 26a is mounted on the bimetal 34 to correspond to the contact blade 26 of Figure 1 and a second contact 28a corresponds to the contact 28 of Figure 1. When a thermal switch is used, it is necessary to compensate for room temperature changes and to do this, I provide a second bimetal blade 36 carrying the contact 28a. The bimetal blades 34 and 36 have the same physical characteristics so that the difference in room temperature affects them equally and they are mounted so that both flex in the same direction— h indicating the direction of flexure as a result of being heated.

In Figure 4 a somewhat similar arrangement is provided except that the heater H, instead of being under control of the monitoring switch S² only, is also under control of the main control switch S¹ by shunting it the same as the motor does in Figure 2.

The arrangement shown in Figure 3 has one fault the same as that in Figure 1 which was remedied by the Figure 2 arrangement, and that is that contacts 26a and 28a open and close constantly at a substantially predetermined rate and act as a reset timer only when the relay R happens to be in the "off" position. It then acts as a circuit interrupter for de-energizing the blanket unnecessarily when the relay is in the normal or "on" position. In this case the blanket has not attained the proper temperature even though it was de-energized.

In the circuit of Figure 4, this fault is eliminated and one additional advantage obtained. The fault eliminated is that the bimetal heater H is not energized until after the relay contacts or main switch S¹ is opened. Then using the blanket current, since the heater is at that time in series with the heating element, the reset or monitoring switch S² is opened in a matter of seconds de-energizing the blanket and resetting the relay. Thus when the relay contacts S¹ open, the heater H is energized heating the bimetal 34 which opens the resetting switch S² and de-energizes the blanket. The extra advantage to this circuit is that the heater H, not being energized until the relay opens, affords an excellent quick method of reset by opening of the switch S² because the circuit never opens until the relay senses that the heating element HE has reached its proper temperature at which cut-off is desirable.

The temperature of HE and the blanket temperature are not necessarily the same at any given room temperature. Thus the second bimetal blade 36 provides for such compensation. This may change the length of the "off" cycle, but also changes the "on" cycle by allowing HE to cool more with a longer "off" cycle causing the "on" cycle to be longer to heat the element HE to the pull-in position of the relay R. Better compensation, however, may be secured by the arrangement shown in Figure 5.

With specific reference to Figure 5, the bimetal compensator 36 of Figures 3 and 4 has been eliminated and a negative temperature coefficient resistor 38 has been cut into the circuit of the voltage coil V. This changes the bias on the relay R so that in a cooler room the relay is automatically adjusted to permit lower current (higher heat) to flow before the pull-in position of the relay is reached and the circuit opened at the switch S¹. In this way the problem of compensation is taken care of because the resistor 38 automatically adjusts the relay to stay energized for a longer length of time as the room gets cooler.

From the foregoing specification, it will be obvious that I have provided a combination of differential relay and monitoring switch for controlling the temperature of a warming blanket or the like and compensating the control for room temperature. While a number of monitoring switches are disclosed, they cooperate with the differential relay in substantially the same manner as far as resetting the relay is concerned, but differ somewhat in their response to room temperature which is also an important factor in connection with the proper control of the temperature of a warming blanket.

Changes of the character disclosed throughout the drawings and specification and others as well may be made without departing from the real spirit and purpose of my invention, and it is my intention to cover by my claims any modified forms of structure or use of mechanical equivalents which may be reasonably included within their scope.

I claim as my invention:

1. In a temperature control for an electric blanket: a heating circuit including a blanket heating element having a positive temperature coefficient of resistance; a primary heat control including a differential relay having normally closed contacts in said circuit in series with the blanket-heating element, said differential relay comprising a series winding in said circuit in series with said heating element and said normally closed contacts and a shunt winding connected in parallel circuit relation with said heating element and said contacts, whereby opening of the contacts de-energizes the series winding without de-energizing the shunt winding, said windings being arranged in opposed and normally balanced relation, said windings assuming an unbalanced relation to effect opening of the relay contacts, so as to open said heating circuit to end a heating cycle, upon an increase in resistance of said heating element due to heating of the blanket to a pre-determined temperature and locking in the contact-open position upon opening of the contacts; and continuously energized and cyclically operated timing means, the energization and cyclical operation of which timing means is independent of sensed temperature of the blanket heating circuits or of the condition of said differential relay, being operable recurrently and momentarily to interrupt current flow through the shunt winding, said interruptions of current flow being operative, after said relay contacts have been opened and locked in said contact-open position, to restore the differential relay to the normally closed condition for successive blanket heating cycles.

2. In a temperature control for an electric blanket: a heating circuit including a blanket heating element having a positive temperature coefficient of resistance; a primary heat control including a differential relay having normally closed contacts in said circuit in series with the blanket-heating element, said differential relay comprising a series winding in said circuit in series with said heating element and said normally closed contacts and a shunt winding connected in parallel circuit relation with said heating element and said contacts, whereby opening of the contacts de-energizes the series winding without de-energizing the shunt winding, said windings being arranged in opposed and normally balanced relation, said windings assuming an unbalanced relation to effect opening of the relay contacts, so as to open said heating circuit to end a heating cycle, upon an increase in resistance of said heating element due to heating of the blanket to a pre-determined temperature and locking in the contact-open position upon opening of the contacts; and continuously energized and cyclically operated timing means, the energization and cyclical operation of which timing means is independent of sensed temperature of the blanket heating circuits or of the condition of said differential relay, being operable recurrently and momentarily to interrupt current flow through the shunt winding, said interruptions of current flow being operative, after said relay contacts have been opened and locked in said contact-open position, to restore the differential relay to the normally closed condition for successive blanket heating cycles; and a variable resistance in series circuit relation with the shunt winding for manual adjustment of the controlled blanket temperature.

3. In a temperature control for an electric blanket: a heating circuit including a blanket heating element having a positive temperature coefficient of resistance; a primary heat control including a differential relay having normally closed contacts in said circuit in series with the blanket-heating element, said differential relay comprising a series winding in said circuit in series with said heating element and said normally closed contacts and a shunt winding connected in parallel circuit relation with said heating element and said contacts, whereby opening of the contacts de-energizes the series winding without de-energizing the shunt winding, said windings being arranged in opposed and normally balanced relation, said windings assuming an unbalanced relation to effect opening of the relay contacts, so as to open said heating circuit to end a heating cycle, upon an increase in resistance of said heating element due to heating of the blanket to a predetermined temperature and locking in the contact-open position upon opening of the contacts; and continuously energized and cyclically operated timing means, the energization and cyclical operation of which timing means is independent of sensed temperature of the blanket heating circuits or of the condition of said differential relay, being operable recurrently and momentarily to interrupt current flow through the shunt winding, said interruption of current flow being operative, after said relay contacts have been opened and locked in said contact-open position, to restore the differential relay to the normally closed condition for successive blanket heating cycles, and said interruptions in current flow being at pre-determined spaced intervals and occupying a minor portion of the time of a full cycle of said timing means.

4. In a temperature control for an electric blanket: a heating circuit including a blanket heating element having a positive temperature coefficient of resistance; a primary heat control including a differential relay having normally closed contacts in said circuit in series with the blanket-heating element, said differential relay comprising a series winding in said circuit in series with said heating element and said normally closed contacts and a shunt winding connected in parallel circuit relation with said heating element and said contacts, whereby opening of the contacts de-energizes the series winding without de-energizing the shunt winding, said windings being arranged in opposed and normally balanced relation, said windings assuming an unbalanced relation to effect opening of the relay contacts, so as to open said heating circuit to end a heating cycle, upon an increase in resistance of said heating element due to heating of the blanket to a predetermined temperature and locking in the contact-open position upon opening of the contacts; and continuously energized and cyclically operated timing means, the energization and cyclical operation of which timing means is independent of sensed temperature of the blanket heating circuits or of the condition of said differential relay, being operable recurrently and momentarily to interrupt current flow through the shunt winding, said interruption of current flow being operative, after said relay contacts have been opened and locked in said contact-open position, to restore the differential relay to the normally closed condition for successive blanket heating cycles, and said interruption in current flow being at predetermined spaced intervals and occupying a minor portion, in the order of one-tenth of the time of a full cycle of said timing means.

References Cited in the file of this patent
UNITED STATES PATENTS

| | | |
|---|---|---|
| 919,402 | Trumpler | Apr. 27, 1909 |
| 1,183,814 | Haagn | May 16, 1916 |
| 1,528,053 | Hands | Mar. 3, 1925 |
| 2,057,902 | Moreau | Oct. 20, 1936 |
| 2,477,819 | Newell | Aug. 2, 1949 |
| 2,510,041 | Rudahl | May 30, 1950 |
| 2,549,095 | Huck | Apr. 17, 1951 |
| 2,592,525 | Huck | Apr. 15, 1952 |
| 2,636,959 | Huck | Apr. 28, 1953 |
| 2,709,216 | Moran et al. | May 24, 1955 |

OTHER REFERENCES

McNairy: Abstract of application Serial No. 725,852, published April 11, 1950.